United States Patent
Henderson et al.

(10) Patent No.: US 7,530,448 B2
(45) Date of Patent: May 12, 2009

(54) TRANSFER CHAIN WITH A LUG AND CAP MOUNTED THEREON

(75) Inventors: Deane R. Henderson, Salmon Arm (CA); Bruce Gordon Halverson, Salmon Arm (CA); William R. Newnes, Calgary (CA)

(73) Assignee: Northern Plastics Ltd., Salmon Arm (CA)

( * ) Notice: Subject to any disclaimer, the term of this patent is extended or adjusted under 35 U.S.C. 154(b) by 35 days.

(21) Appl. No.: 11/520,565

(22) Filed: Sep. 14, 2006

(65) Prior Publication Data
US 2008/0073181 A1 Mar. 27, 2008

(51) Int. Cl.
*B65G 15/42* (2006.01)
(52) U.S. Cl. .................. 198/699.1; 198/688.1
(58) Field of Classification Search .......... 198/692, 198/699.1, 730, 731, 867.01, 867.14, 867.15
See application file for complete search history.

(56) References Cited

U.S. PATENT DOCUMENTS

| | | | |
|---|---|---|---|
| 2,019,389 A | | 10/1935 | Bogaty |
| 2,930,478 A | * | 3/1960 | Ruffino ...................... 198/731 |
| 3,495,551 A | | 2/1970 | Billingham |
| 3,559,796 A | * | 2/1971 | Marks et al. ................. 198/692 |
| 3,952,860 A | * | 4/1976 | Specht ........................ 198/701 |
| 4,009,630 A | | 3/1977 | Ekholm |
| 4,136,768 A | | 1/1979 | Yateman et al. |
| 4,927,002 A | * | 5/1990 | Springman ............... 198/487.1 |
| 5,074,401 A | * | 12/1991 | Morita et al. ............. 198/465.1 |
| 5,136,834 A | * | 8/1992 | Stadele ......................... 57/281 |
| 5,165,522 A | * | 11/1992 | Uttke et al. ................. 198/716 |
| 5,165,523 A | * | 11/1992 | Wooley et al. ............. 198/731 |
| 5,337,887 A | | 8/1994 | Greenwell et al. |
| 5,699,895 A | * | 12/1997 | Materne et al. ............. 198/731 |
| 5,911,303 A | | 6/1999 | Malanowski |
| 5,915,524 A | * | 6/1999 | Horlacher ................ 198/473.1 |
| 6,183,370 B1 | | 2/2001 | Lim |
| 6,237,755 B1 | * | 5/2001 | Clopton ................. 198/867.13 |
| 6,471,041 B1 | * | 10/2002 | Long et al. ................ 198/699.1 |
| 6,964,334 B2 | * | 11/2005 | Henderson et al. .......... 198/841 |

* cited by examiner

*Primary Examiner*—Mark A Deuble
(74) *Attorney, Agent, or Firm*—Antony C. Edwards

(57) ABSTRACT

A workpiece support mountable onto a workpiece conveyor, the support including a rigid vertically upstanding member, which is vertical when mounted onto an upper-most surface of the workpiece conveyor, and a cap mounted onto the upstanding member. The cap includes a housing defining a cavity. The housing is substantially entirely sealed around the cavity so as to inhibit detritus entering the cavity. The cavity has an opening at a lower-most end thereof. The opening is for snug mounting of the cap onto the upstanding member when the upstanding member is journalled snugly in the cavity.

10 Claims, 11 Drawing Sheets

US 7,530,448 B2

TRANSFER CHAIN WITH A LUG AND CAP MOUNTED THEREON

FIELD OF THE INVENTION

This invention relates to the field of lugged transfers and more particularly to lug pins or buttons and covers therefor.

BACKGROUND OF THE INVENTION

Conventional lug pins are conventionally attached such as by welding to chains for use on chainway conveyor systems in various applications, for example, in wood processing facilities such as sawmills. Typically a metal lug pin is welded onto the chain and which protrudes upwardly. Direct contact between materials being conveyed on a chainway conveyor which are sensitive to marking or damage from metal and the metal parts of that conveyor system, such as metal lug pins or the chain, can cause marking or damage to such materials. Consequently a collar made of, for example, Ultra High Molecular Weight Polyethylene ("UHMW"), may be rotatably mounted onto the upstanding lug pin so as to be free to rotate about the lug pin. However, in the prior art, the top of the lug pin is exposed in or from the top of the collar. The collar is ordinarily removably secured onto the top of the lug pin by means of a clip, or secured by welding a retaining washer onto the top of the lug pin.

It is important that the collar be allowed to rotate about the lug pin in the manner of a roller so that the elongate workpiece materials, such as boards, being conveyed on the chains by being pushed along by contact with, so as to rest against the lug pins, are free to be translated laterally relative to the direction of flow along the chains. This may be required, for example, where boards need to be urged against a fence before trimming, etc. Because the top of the lug pin is exposed, however, dirt, sawdust and other detritus collect in the annular space between the lug pin and the collar. The resultant accumulation of foreign particles between the lug pin and the collar can cause the rotation of the collar around the lug pin to bind or seize thereby interfering with or preventing the proper functioning of the chainway conveyor.

SUMMARY OF THE INVENTION

The present invention is an improved lug system for mounting onto a chain transfer comprising an inverted cup-shaped cover or housing (hereinafter alternatively and collectively referred to as a lug cover) which snugly and rotatively mounts on top of, so as to journal therein, an upstanding lug pin which is rigidly mounted onto the chain. The lug cover may, without intending to be limiting, be made of a durable slightly resilient material such as UHMW or the like. The lug cover is releasably held onto the lug pin by a rib or ribs mating in a sliding and rotatable snug engagement with corresponding annular grooves. In one embodiment an annular rib protrudes from the external cylindrical wall of the lug pin near its base. The base is mounted as by welding onto at least one link of the transfer chain. The rib or ribs lie in a first plane parallel to a second plane containing the base or corresponding link. The annular rib mounts into a corresponding annular groove formed around the inside lip or surface defining the internal cavity of the lug cover. The rib may also be formed on the inside cavity of the lug cover and mate with a corresponding annular groove formed on the lug pin. Because the lug cover is sized to slide down snugly over the lug pin, and because the lug cover is slightly resilient, the lug cover may be driven downward onto the top of the lug pin by the use of a mallet or similar tool so as to "pop" the lug pin annular rib into the lug cover annular groove thereby securely mounting the lug cover, in its inverted position, onto the lug pin thus while allowing for rotation of the lug cover relative to the pin about an axis of rotation which is substantially orthogonal to the first plane. The lug cover can freely rotate around the lug pin so as to act as a roller lug. Because the lug cover does not open upwardly, that is, is sealed from the intrusion of dirt, sawdust or other foreign particles or detritus into the interface or space between the lug pin and the lug cover, thereby reducing the likelihood of the rotation of the lug cover around the lug pin binding or seizing.

In another embodiment of the present invention a shorter lug pin is fixably mounted onto the chain. Depending upon the application, one or more of the individual chain links may each be fitted with such a lug pin. A lug cover is sized to fit snugly over each such lug pin fixably mounted on a chain link and, again, may be mounted to the lug pin by the resilient deformation of the lug cover as it is forced onto the lug pin so as to engage an annular rib, for example formed on either the lug cover or the lug pin, in the corresponding annular groove in the lug pin or lug cover respectively. The shorter or lower profile lug pin and cover embodiment may be useful for conveying materials such as for example, without intending to be limiting, certain wood products such as elongate workpieces including boards, on a chainway which are sensitive to the marking or damage which may be caused by contact between those materials and both the metal lug pins or chain of the chainway. This if each chain link is fitted with a low profile lug pin and its corresponding lug cover then, depending upon the relative size of the chain links and the materials being conveyed on the chainway, the materials being conveyed may rest primarily or entirely on the individual low profile lug covers such that contact between the conveyed materials and the lug pins and chain would be decreased or eliminated, thereby reducing or preventing the marking or damage which might otherwise be caused to the materials by exposed metal lug pins or chain. Again, depending upon the nature of the application, the lug covers may, without intending to be limiting, be made of a durable slightly resilient material such as UHMW which may, depending upon the slightly resilient material selected and the degree of hardness of that material, create a more lubricious or slippery surface when higher slippage or lower friction is desired, or a more viscous, tacky or otherwise less slippery surface where higher friction between the workpiece and lug covers is desired.

In summary, the present invention may be characterized in one aspect as including a workpiece support mountable onto a workpiece conveyor, the support including a rigid vertically upstanding member, which is vertical when mounted onto an upper-most surface of the workpiece conveyor, and a cap mounted onto the upstanding member. The cap includes a housing defining a cavity. The housing is substantially entirely sealed around the cavity so as to inhibit detritus entering the cavity. The cavity has an opening at a lower-most end thereof. The opening is for snug mounting of the cap onto the upstanding member when the upstanding member is journalled snugly in the cavity.

The workpiece conveyor may be a transfer chain and the upstanding member may have advantageously a lower-most base sized for rigid mounting onto at least one link or a single link of the transfer chain. The base extends from the opening.

The upstanding member may be a lug for engaging the cap against a side edge of the workpiece when the workpiece is resting on the chain so as to urge the workpiece along a feed path simultaneously with translation of the transfer chain. The upstanding member may also be a disc for engaging the cap against an under-side of the workpiece when on the transfer chain so as to elevate the workpiece from contact with the chain.

The cap may be mounted on the upstanding member by means of a male/female interlocking mating means between an outer surface of the upstanding member and an inner surface of the cavity. The interlocking mating means may include an annular interlocking mating between an annular groove and a mating rib. The interlocking mating may be oriented so as to allow rotation of the cap about the upstanding member. For example, the rotation may be in a substantially horizontal plane about a substantially vertical axis of rotation. In one embodiment the groove is formed on the upstanding member and the rib is on the cap. In another embodiment the groove is formed on the cap and the rib is on the upstanding member.

DETAILED DESCRIPTION OF EMBODIMENTS OF THE INVENTION

Figure 1:
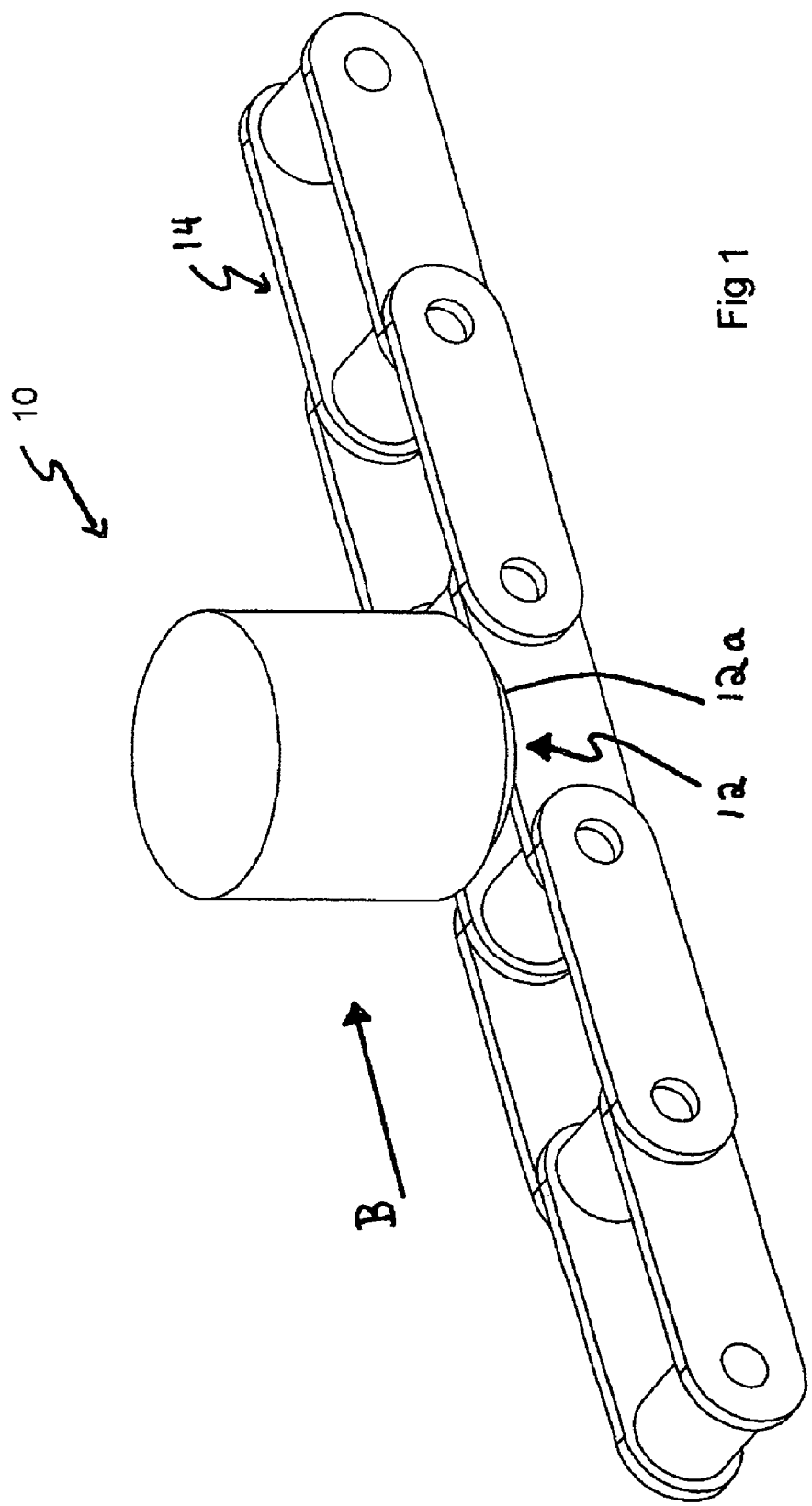
FIG. 1 is, in perspective view, one embodiment of the lug pin and lug cover assembly according to the present invention.
Figure 2:
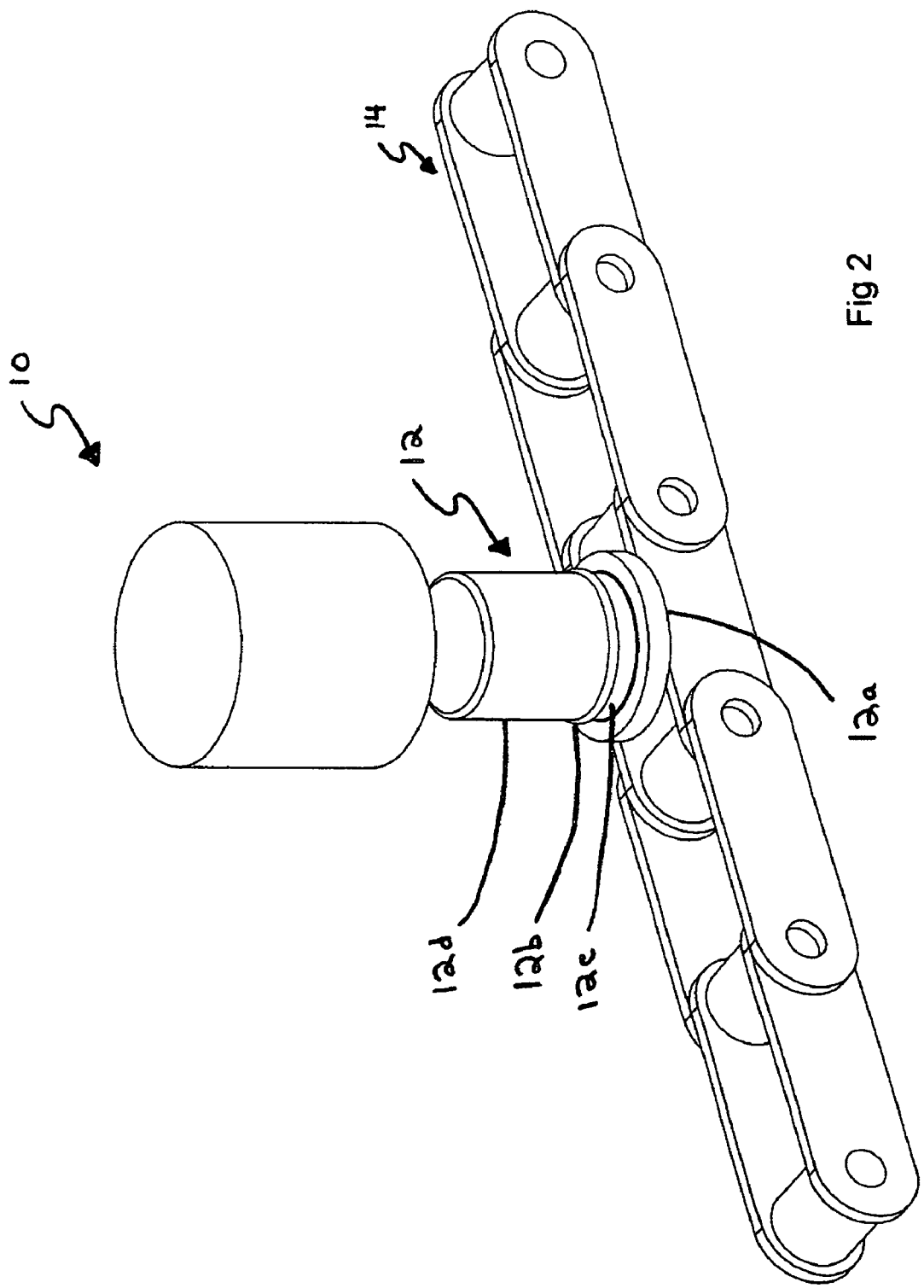
FIG. 2 is, in perspective view, the unassembled lug pin and lug cover assembly shown in FIG. 1.
Figure 3:
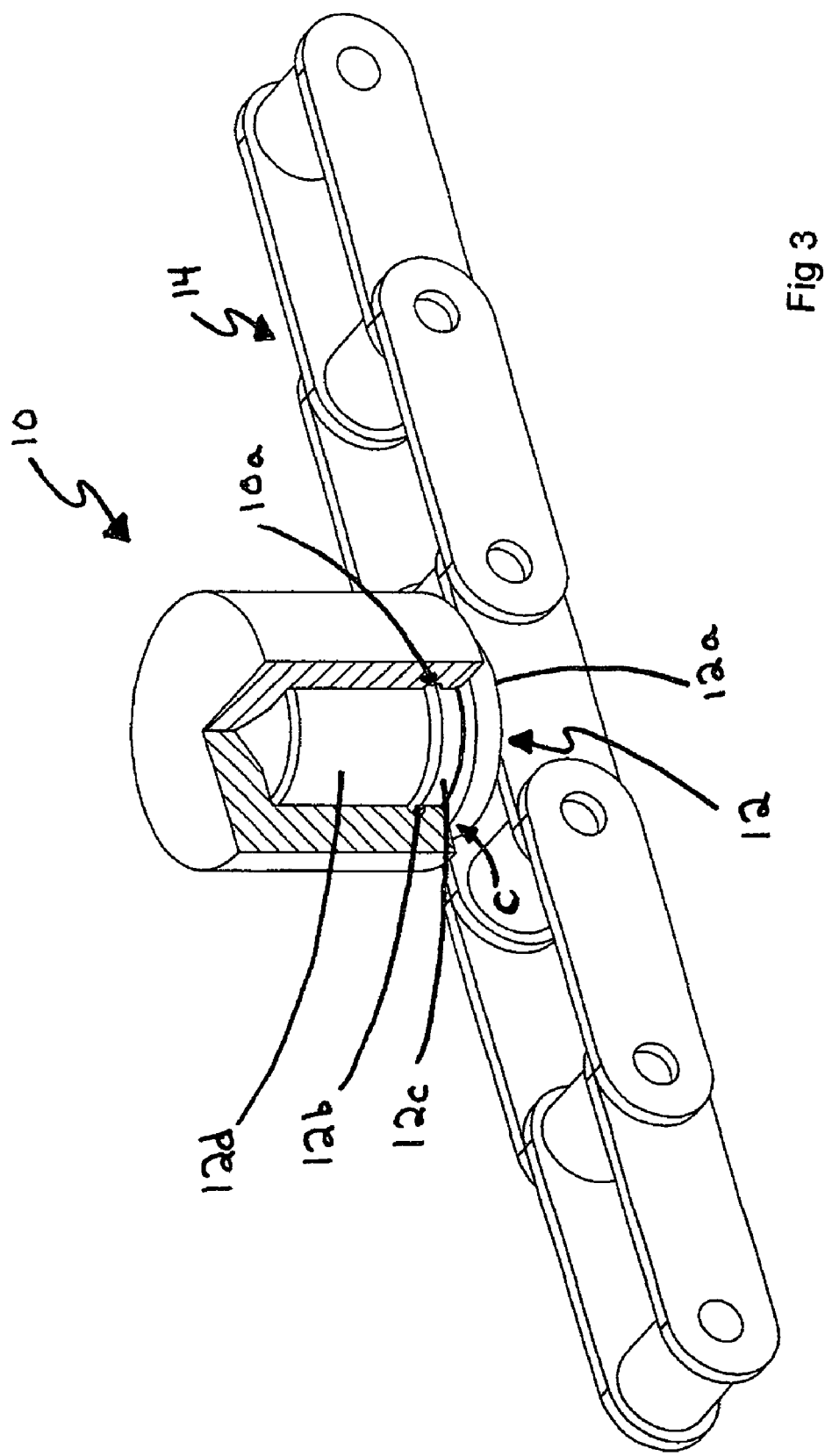
FIG. 3 is, in partially broken-away perspective view, the lug pin and lug cover assembly shown in FIG. 1.

The apparatus of the present invention is an improved lug assembly for mounting onto a conveyor chainway wherein the conventional lug pin and lug collar are replaced with a cover which snugly and rotatively mounts on top of a correspondingly shaped lug pin which, in turn, is fixably mounted onto the conveyor chain.

Without intending to be limiting, FIGS. 1-5, wherein like reference numerals denote corresponding parts in each view, illustrate an embodiment of the present invention wherein lug cover 10 is snugly and rotatably mounted on top of correspondingly shaped upstanding lug pin 12 which is fixably mounted onto chain 14. Without intending to be limiting, as illustrated lug cover 10 may be an inverted cup-shape having a closed or sealed end 10d contiguously forming an end wall of cylindrical side wall 10e. In some embodiments, the cylindrical sidewall 10e may be formed in a tapered shape or in an hourglass shape or otherwise having a waist along the upstanding length thereof for example medially therealong. In some embodiments the ceiling of lug cover cavity 10b may be formed to provide a further conical cavity 10g. Annular groove 10a is formed around the inside lip of lug cover 10 near its basal open end 10c. Lug cover 10 may be made of a slightly resilient durable material such as, without intending to be limiting, UHMW. In its undeformed state, the internal horizontal diameter $d_1$ of lug cover cavity 10b is slightly larger than the corresponding horizontal diameter $d_8$ of lug pin shaft 12d. Without intending to be limiting, the opening of lug cover 10 may be slightly flared at open end 10c to facilitate the mounting of lug cover 10 onto lug pin 12. Annular rib 12b protrudes from lug pin shaft 12d proximate to lug pin base 12a. Lug pin annular rib 12b mounts into corresponding lug cover annular groove 10a. Because lug cover 10 is sized to slide down snugly over lug pin 12, and because lug cover 10 is made of a slightly resilient material, lug cover 10 may be mounted onto lug pin 12 by placing lug cover open end 10c on lug pin top 12e and applying force in direction A to lug cover closed end 10d by means of a mallet or other appropriate device so as to slide lug cover 10 over lug pin shaft 12d and to resiliently force or "pop" lug pin annular rib 12b into lug cover groove 10a thereby securely mounting lug cover 10 onto lug pin 12. Once lug pin annular rib 12b has been resiliently urged into lug cup groove 10a lug cover 10 returns to its undeformed state which returns lug cover cavity 10b diameters $d_1$ and $d_3$ (localized at groove 10a) to their original dimensions.

The diameter $d_1$ of lug cover cavity 10b is slightly larger than the external diameter $d_8$ of lug pin shaft 12d such that lug cover 10 can freely rotate about lug pin 12 to act as a roller lug while the mating of lug cover groove 10a over lug pin annular rib 12b prevents lug cover 10 from becoming accidentally dislodged from lug pin 12 with the movement of chain 14 or the application of external force against lug cover 10 and, consequently, lug pin 12 such as, for example, that which may be created by materials being conveyed in direction B on chain 14. If removal of lug cover 10 from lug pin 12 is required, a chisel or wedge-shaped or other suitable tool may be inserted between lug cover base surface 10f and upper surface 12f of lug pin base 12a and pressure applied in direction C so as to cause the resilient deformation of lug cover 10 and the consequent disengagement of lug pin annular rib 12b and lower end 12c from, respectively, lug cover annular groove 10a and the lower lip of the cover.

As the opening into and cavity of lug cover 10 is inverted when mounted on to lug pin 12, lug cover 10 is sealed on its apical end 10d. At its basal end 10c, lug cover base surface 10f rests upon and overlaps the corresponding upper surface 12f of lug pin base 12a, thereby encasing lug pin shaft 12d and upper surface 12f of lug pin base 12a. Advantageously, because lug cover 10 encases lug pin shaft 12d and covers upper surface 12f of lug pin base 12a, and because lug cover 10 dimensions $d_1$, $d_2$, $d_5$ and $d_6$ are only slightly larger in size than the corresponding dimensions of lug pin 12 dimensions $d_8$, $d_9$, $d_{11}$ and $d_{12}$, the intrusion of dirt, sawdust or other foreign particles into the interface between lug pin shaft 12d and upper surface 12f of lug pin base 12a, and lug cover 10 is minimized so as to reduce the likelihood of the rotation of lug cover 10 around lug pin 12 binding or seizing, thereby reducing downtime and thereby increasing productivity of the mill.

Figure 4:
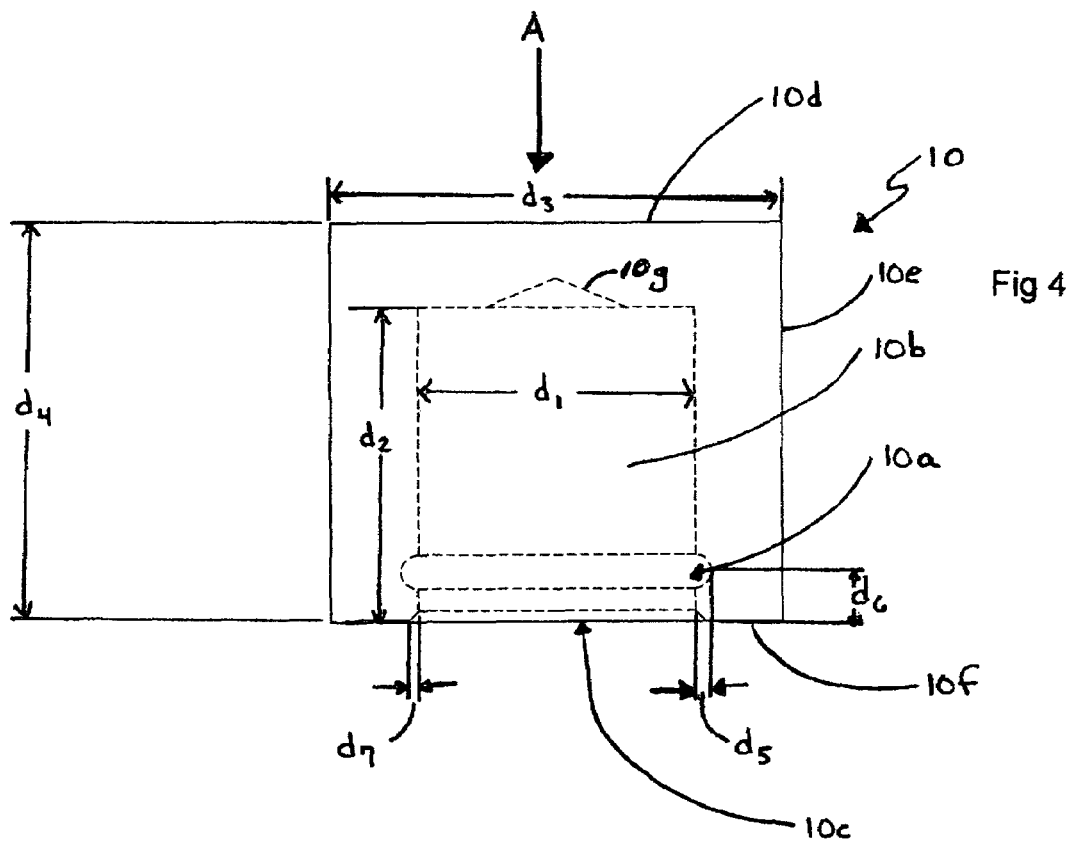
FIG. 4 is an elevation view of the lug cover of the lug pin and lug cover assembly shown in FIG. 1.
Figure 5:
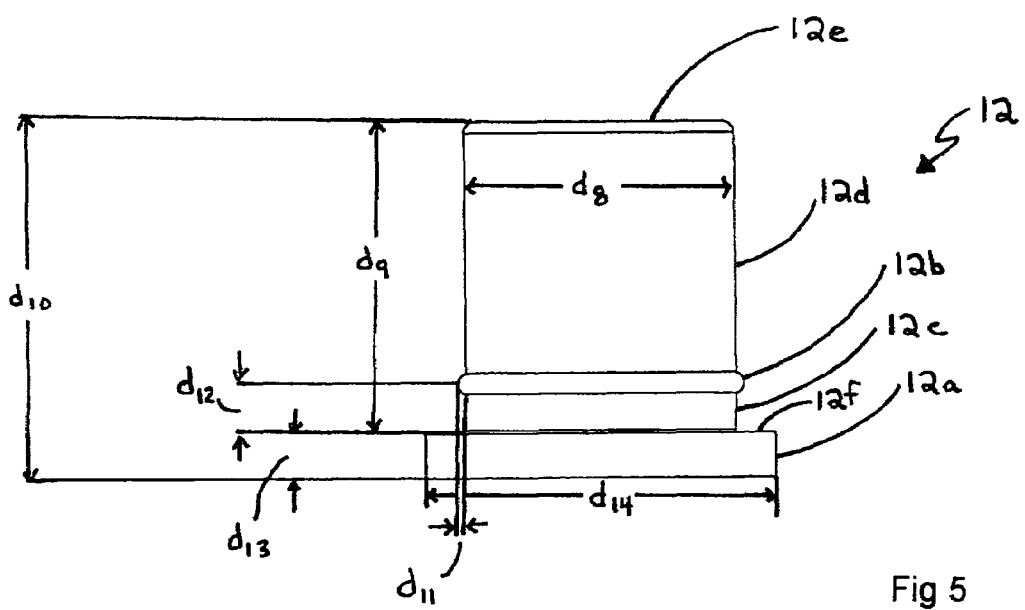
FIG. 5 is an elevation view of the lug pin of the lug pin and lug cover assembly shown in FIG. 1.
Figure 6:
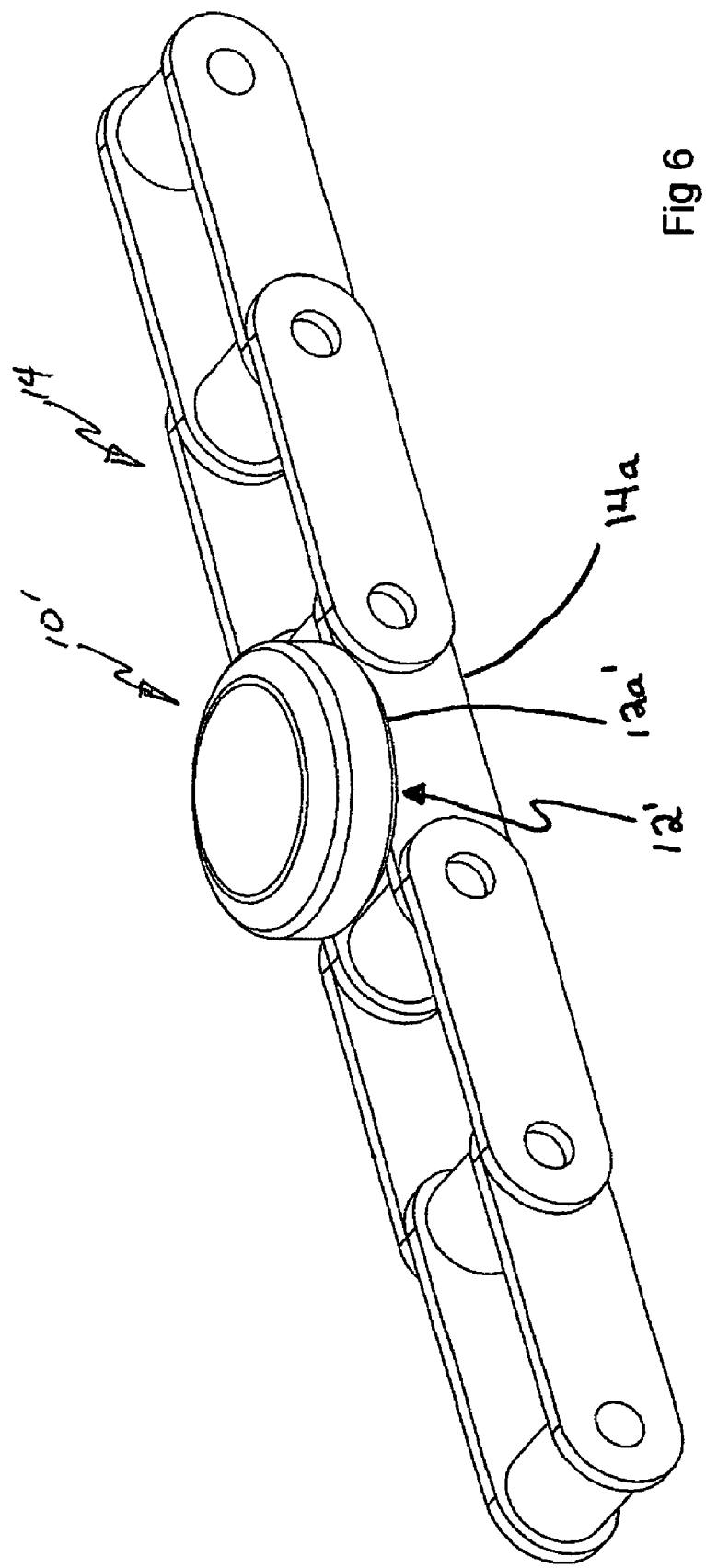
FIG. 6 is, in perspective view, a further embodiment of the lug pin and lug cover assembly according to the present invention.
Figure 7:
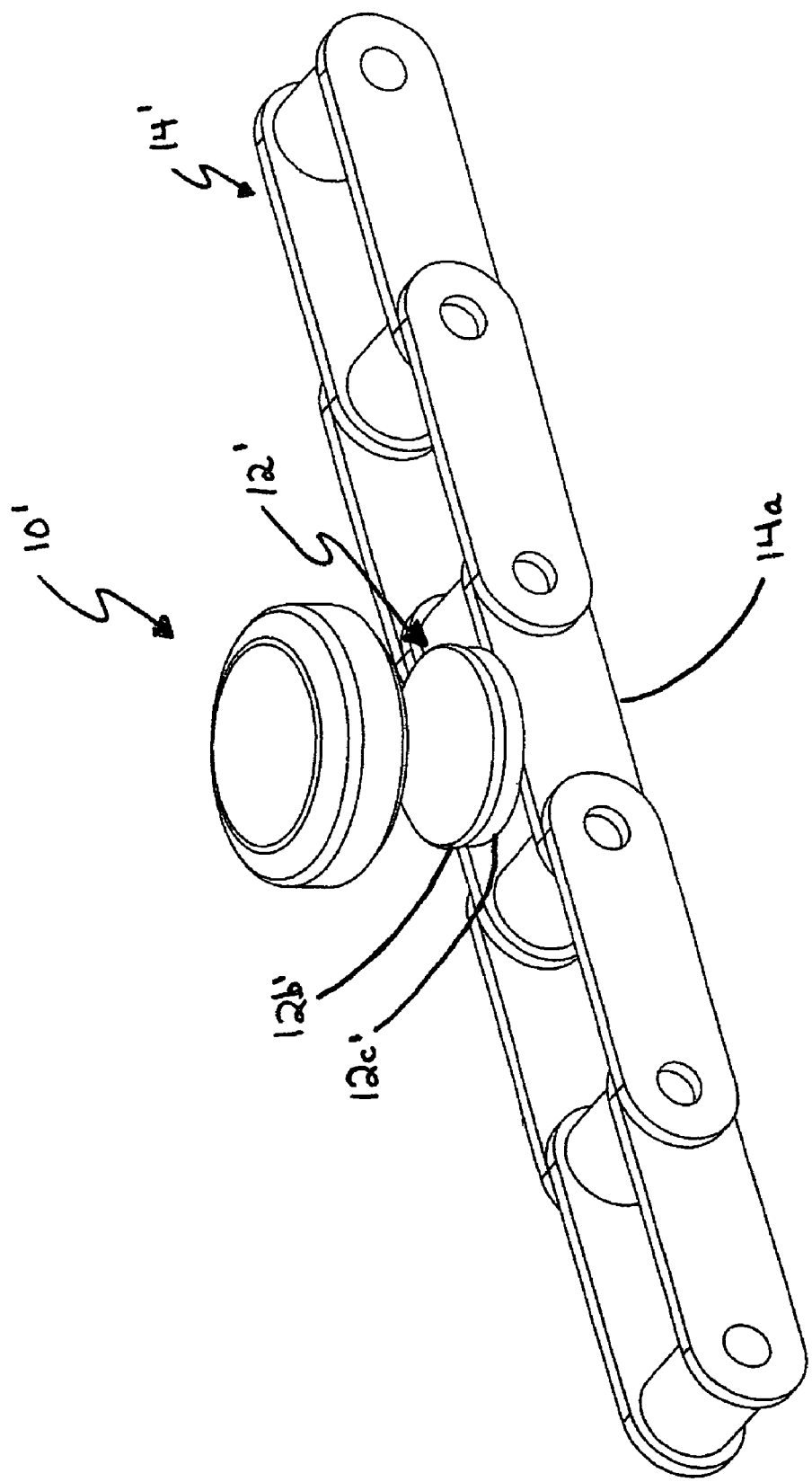
FIG. 7 is, in perspective view, the unassembled lug pin and cover assembly shown in FIG. 6.
Figure 8:
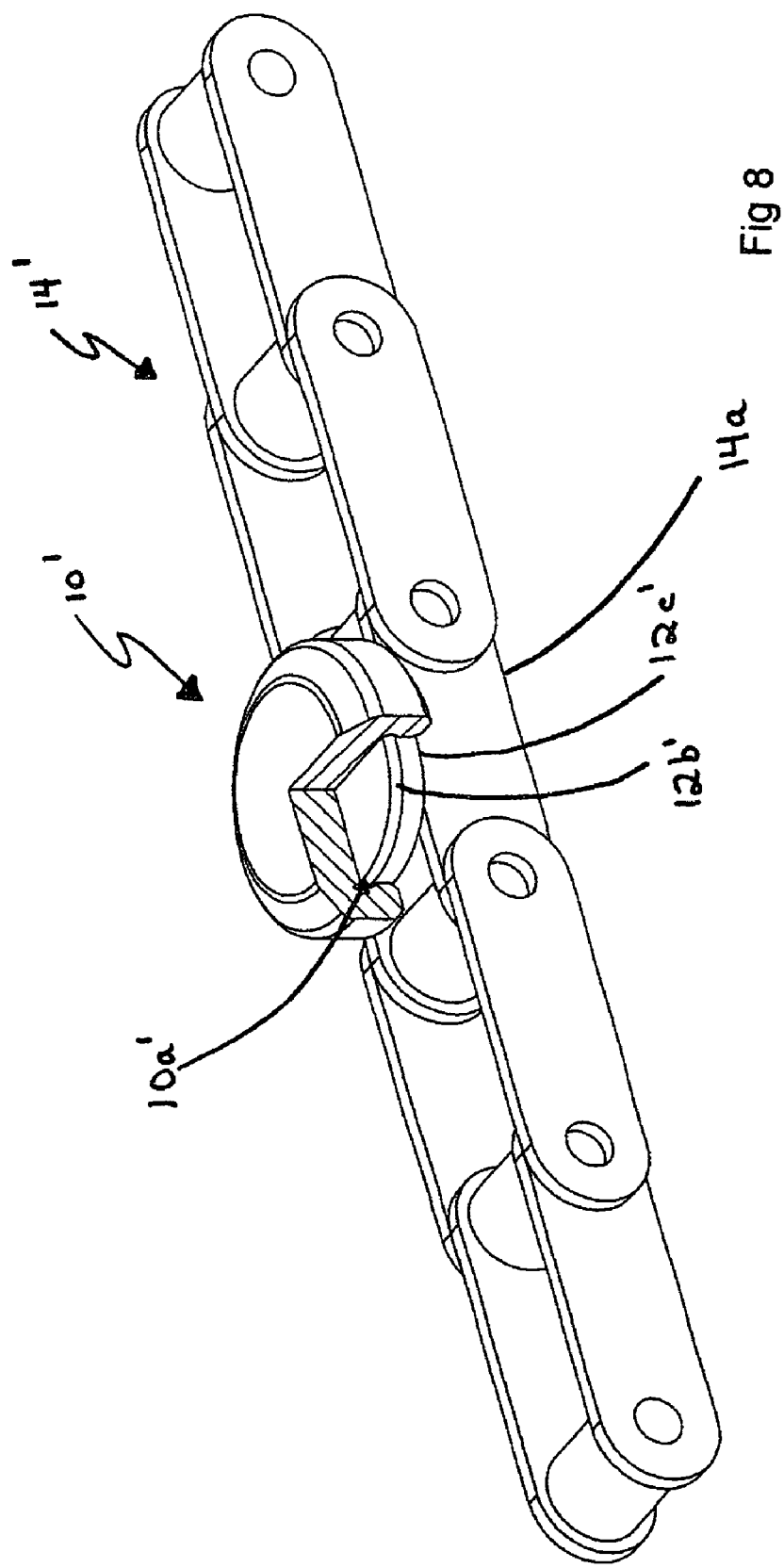
FIG. 8 is, in partially broken-away perspective view, the lug pin and lug cover as shown in FIG. 6.
Figure 9:
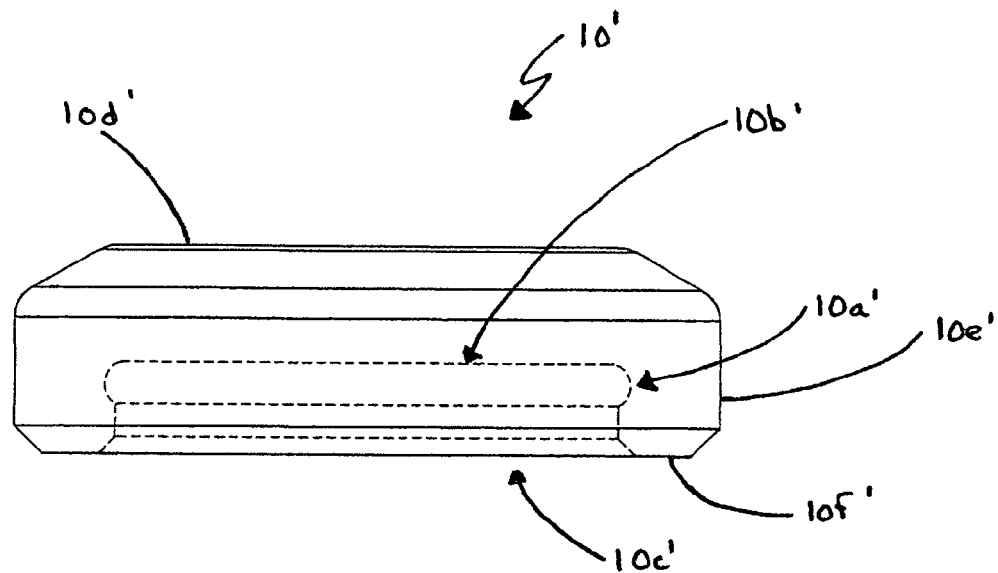
FIG. 9 is, in elevation view, the lug cover of the lug pin and lug cover assembly shown in FIG. 6.
Figure 10:
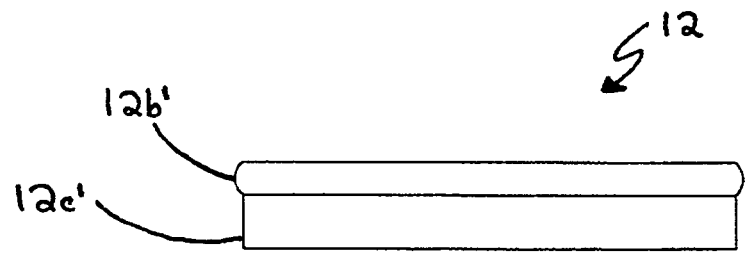
FIG. 10 is, in elevation view, the lug pin of the lug pin and lug cover assembly shown in FIG. 6.

Depending upon the intended application, lug cover 10 and lug pin 12 may have the following dimensions which are not intended to be limiting as seen in FIGS. 4 and 5 respectively:

| | |
|---|---|
| Internal diameter $d_1$ of lug cover cavity 10b | 1.54 inches |
| Internal height $d_2$ of lug cover cavity 10b | 1.77 inches |
| External diameter $d_3$ of lug cover 10 | 2.5 inches |
| External height $d_4$ of lug cover 10 | 2.25 inches |
| Depth $d_5$ of lug cover annular groove 10a | .09 inches |
| Distance $d_6$ between center of lug cover annular groove 10a and lug pin base surface 10f | .28 inches |
| Width $d_7$ of flare on lug cover base 10c | .06 inches |
| Diameter $d_8$ of lug pin shaft 12d | 1.50 inches |
| Height $d_9$ of lug pin shaft 12d | 1.75 inches |
| Height $d_{10}$ of lug pin 12 | 2.00 inches |
| Depth $d_{11}$ of lug pin annular rib 12b | .043 inches |
| Distance $d_{12}$ between center of lug pin annular rib 12b and upper surface 12f of lug pin base 12a | .28 inches |
| Height $d_{13}$ of lug pin base 12a | .25 inches |
| Diameter $d_{14}$ of lug pin base 12a | 1.94 inches |

The above dimensions are illustrative only and as would be apparent to those skilled in the art, would be modified in order to obtain the dimension ratios appropriate to a particular application.

In a low profile embodiment of the present invention is seen in FIGS. 6-10. Again, like reference numerals denote corresponding parts in each view. Lug cover 10' is button-shaped and has an annular groove 10a'. Lug cover 10' fits snugly over a correspondingly sized short metal pin or disc 12' rigidly mounted on chain link 14a and may be mounted to lug pin or disc 12' by the resilient deformation of lug cap 10' as it is forced onto lug pin or disc 12' so as to engage annular rib 12b' in lug cover annular groove 10a'. Lug cover 10' may be snugly and rotatively mounted, or may be fixably mounted, on top of correspondingly shaped lug pin or disc 12'. Such an embodiment may be useful for conveying materials such as for example, without intending to be limiting, certain wood products, on chain 14 which are sensitive to the marking or damage which may be caused to such materials by contact with metal lug pins or chain. If each chain link on chain 14 is fitted with a metal pin or disc 12' and a corresponding low profile lug cover 10', depending upon the relative size of chain 14 and the materials being conveyed on chain 14, the materials being conveyed may rest on individual lug covers 10' such that contact between the conveyed materials and chain 14' would be minimal or non-existent, thereby reducing or eliminating the marking or damage to the conveyed materials which might otherwise be caused by exposed metal lug pins 12' or chain 14. Again, as may be dictated by the nature of the application, lug cover 10' may, without intending to be limiting, be made of a durable slightly resilient material such as UHMW which, depending upon the specifications of the material, may be selected for its degree of hardness or for the degree of sliding friction it generates under a workpiece.

Figure 11:
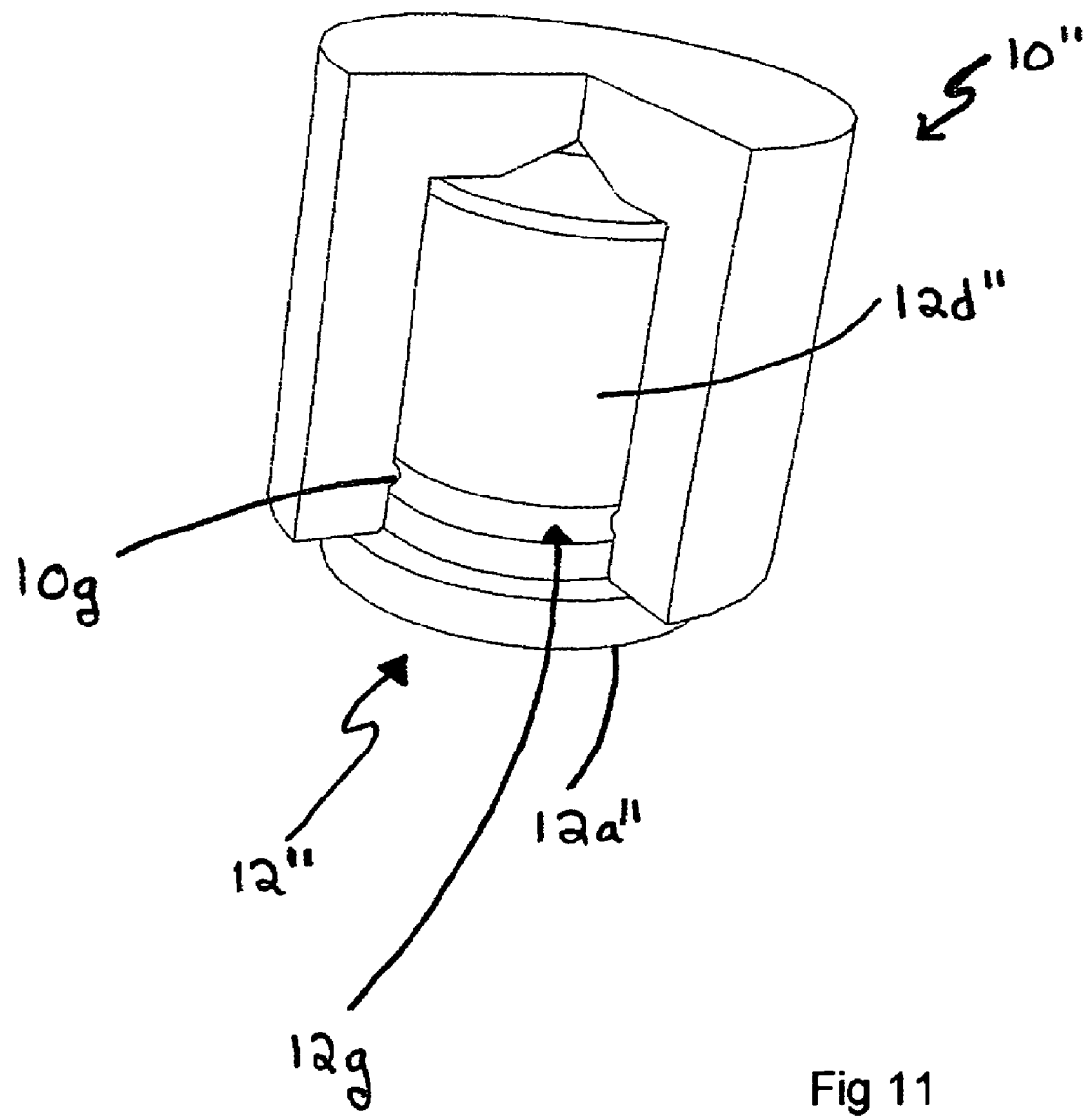
FIG. 11 is, in partially broken-away perspective view, a further embodiment of the lug pin and lug cover assembly according to the present invention.
Figure 12:
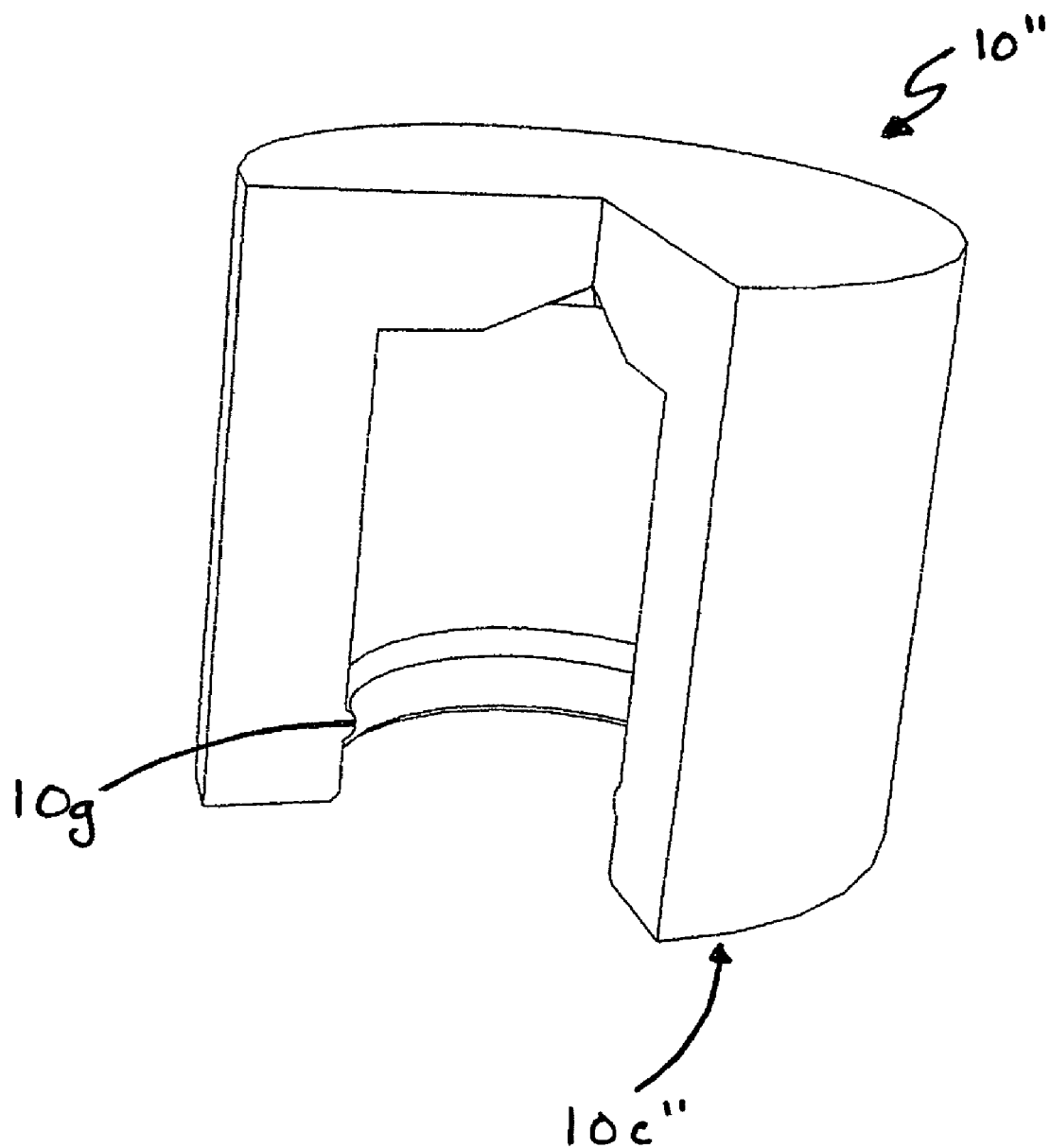
FIG. 12 is, in partially broken-away perspective view, the lug cover of the lug pin and lug cover assembly shown in FIG. 11.
Figure 13:
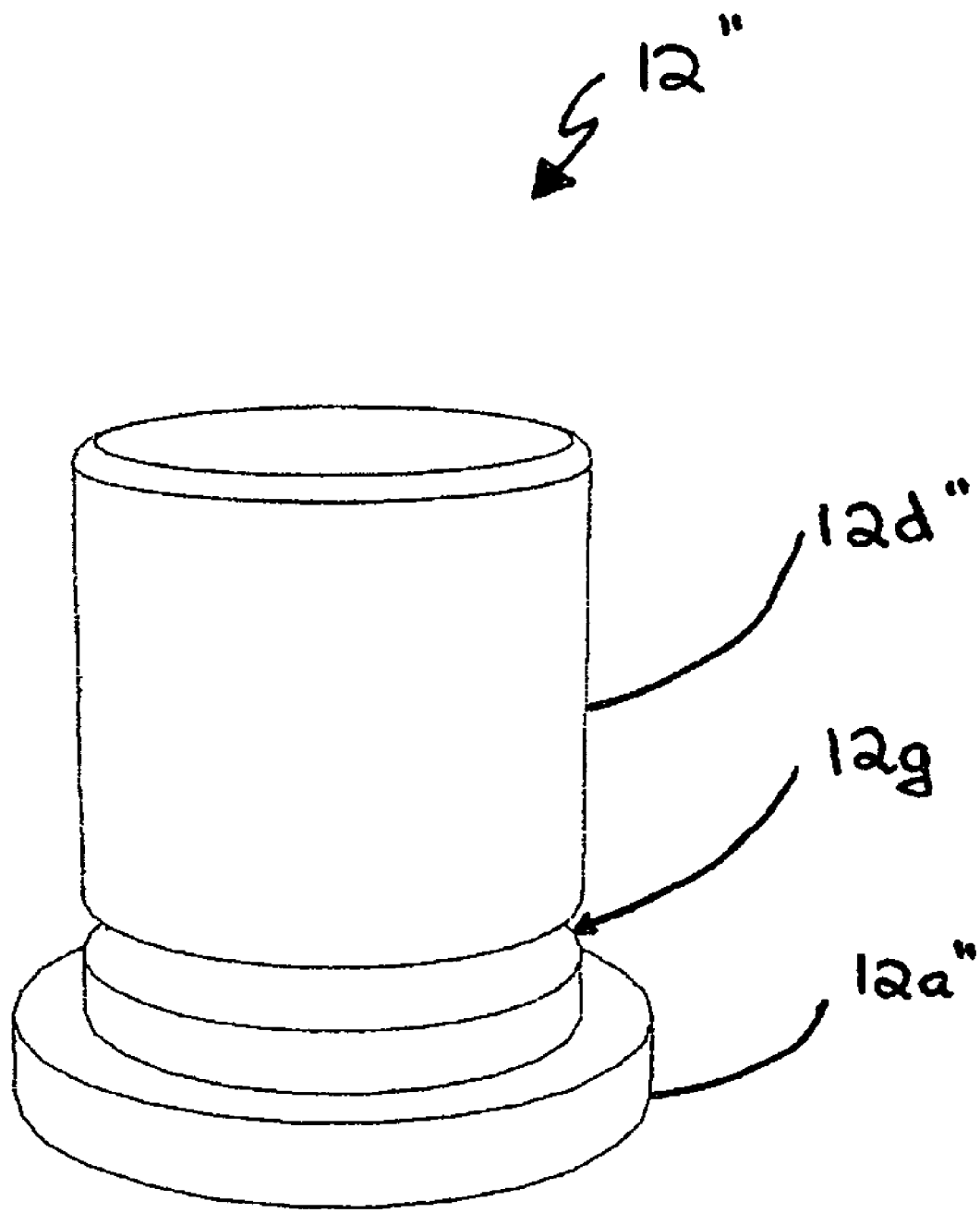
FIG. 13 is, in elevation view, the lug pin of the lug pin and lug cover assembly shown in FIG. 11.

In an alternative embodiment of the present invention as seen in FIGS. 11-13, wherein like reference numerals denote corresponding parts in each view, annular rib 10g protrudes from the inside lip of lug cover 10" near its basal end 10c". Lug pin 12" has an annular groove 12g formed around lug pin shaft 12d" near lug pin base 12a". Lug cover annular rib 10g mounts into corresponding lug pin groove 12g.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A workpiece support mountable onto a workpiece conveyor, the support comprising:
a rigid vertically upstanding member, vertical when mounted onto an upper-most surface of a workpiece conveyor,
a cap mounted onto said upstanding member,
wherein said cap includes a housing defining a cavity and wherein said housing is substantially entirely sealed around said cavity so as to inhibit detritus entering said cavity with the exception that said cavity has an opening therein at a lower-most end thereof, said opening for snug mounting of said cap onto said upstanding member, said upstanding member journalled snugly in said cavity,
wherein said cap is mounted on said upstanding member by means of a male/female interlocking mating means between an outer surface of said upstanding member and an inner surface of said cavity
wherein said interlocking mating means includes an annular interlocking mating between an annular groove and a mating rib so as to allow rotation of said rib in said groove, and wherein said interlocking mating is oriented so as to allow rotation of said cap about said upstanding member, and wherein said rotation is in a substantially horizontal plane about a substantially vertical axis of rotation when said upstanding member is vertical.

2. The workpiece support of claim 1 wherein said workpiece conveyor is a transfer chain and wherein said upstanding member has a lower-most base sized for rigid mounting onto at least one link of the transfer chain, said base extending from said opening.

3. The workpiece support of claim 2 wherein said upstanding member is a lug and said cap is cylindrical for engaging said cap against a side edge of the workpiece when the workpiece is resting on the chain so as to urge the workpiece along a feed path simultaneously with translation of the transfer chain, and so as to allow lateral translation of the workpiece simultaneously laterally across the transfer chain while the workpiece is resting against said cap, wherein said cap rotates about said lug during said lateral translation.

4. The workpiece support of claim 2 wherein said upstanding member is a disc for engaging said cap against an underside of the workpiece when on the transfer chain so as to elevate the workpiece from contact with the chain.

5. The workpiece support of claim 2 wherein said at least one link is a single link.

6. The workpiece support of claim 1 wherein said groove is formed on said upstanding member and said rib is on said cap.

7. The workpiece support of claim 1 wherein said groove is formed on said cap and said rib is on said upstanding member.

8. The workpiece support of claim 1 wherein said cavity is sized so that said housing substantially completely covers said upstanding member.

9. The workpiece support of claim 8 wherein said cap has a lower edge around said lower-most end of said cavity, and wherein said upstanding member has a base extending from a lower-most end of said upstanding member, and wherein said lower edge of said can substantially seals down against said base when said cap is mounted on said upstanding member.

10. The workpiece support of claim 1 wherein said cap is resilient so as to provide a snap-on fit of said can onto said upstanding member to engage said rib in said groove for a snug rotatable fit of said rib in said groove.

* * * * *